(12) United States Patent
Chun

(10) Patent No.: US 9,128,544 B2
(45) Date of Patent: Sep. 8, 2015

(54) MOBILE TERMINAL AND CONTROL METHOD SLIDABLY DISPLAYING MULTIPLE MENU SCREENS

(75) Inventor: Jin-Woo Chun, Gyeonggi-Do (KR)

(73) Assignee: LG ELECTRONICS INC., Seoul (KR)

( * ) Notice: Subject to any disclaimer, the term of this patent is extended or adjusted under 35 U.S.C. 154(b) by 669 days.

(21) Appl. No.: 12/467,821

(22) Filed: May 18, 2009

(65) Prior Publication Data
US 2010/0182248 A1 Jul. 22, 2010

(30) Foreign Application Priority Data
Jan. 19, 2009 (KR) ........................ 10-2009-0004288

(51) Int. Cl.
| G06F 3/041 | (2006.01) |
|---|---|
| G06F 3/044 | (2006.01) |
| G06F 3/0488 | (2013.01) |
| H04M 1/02 | (2006.01) |
| H04M 1/725 | (2006.01) |

(52) U.S. Cl.
CPC ............... *G06F 3/041* (2013.01); *G06F 3/044* (2013.01); *G06F 3/0414* (2013.01); *G06F 3/04883* (2013.01); *G06F 3/04886* (2013.01); *H04M 1/0214* (2013.01); *H04M 1/72583* (2013.01); *H04M 2250/22* (2013.01)

(58) Field of Classification Search
None
See application file for complete search history.

(56) References Cited

U.S. PATENT DOCUMENTS

| 5,889,236 | A | * | 3/1999 | Gillespie et al. ........... 178/18.01 |
|---|---|---|---|---|
| 6,662,244 | B1 | * | 12/2003 | Takahashi ....................... 710/14 |
| 2002/0094846 | A1 | * | 7/2002 | Kishimoto et al. ........... 455/566 |
| 2003/0117440 | A1 | * | 6/2003 | Hellyar et al. ................. 345/767 |
| 2006/0095846 | A1 | * | 5/2006 | Nurmi ............................ 715/701 |
| 2006/0171525 | A1 | * | 8/2006 | Kusaka et al. ........... 379/355.09 |
| 2006/0281453 | A1 | * | 12/2006 | Jaiswal et al. ................ 455/423 |
| 2007/0236475 | A1 | * | 10/2007 | Wherry ......................... 345/173 |
| 2007/0254722 | A1 | * | 11/2007 | Kim et al. ..................... 455/566 |
| 2007/0287432 | A1 | | 12/2007 | Jung |
| 2008/0062141 | A1 | * | 3/2008 | Chandhri ...................... 345/173 |
| 2008/0150903 | A1 | * | 6/2008 | Chuang ......................... 345/173 |
| 2008/0168404 | A1 | * | 7/2008 | Ording .......................... 715/863 |
| 2008/0180391 | A1 | * | 7/2008 | Auciello et al. .............. 345/156 |
| 2008/0282196 | A1 | * | 11/2008 | Park ............................... 715/838 |
| 2009/0002335 | A1 | * | 1/2009 | Chaudhri ...................... 345/173 |
| 2009/0058828 | A1 | * | 3/2009 | Jiang et al. ................... 345/173 |
| 2009/0179867 | A1 | * | 7/2009 | Shim et al. ................... 345/173 |
| 2009/0265671 | A1 | * | 10/2009 | Sachs et al. .................. 715/863 |
| 2012/0019466 | A1 | | 1/2012 | Baik |

FOREIGN PATENT DOCUMENTS

| KR | 10-0764652 B1 | 10/2007 |
|---|---|---|
| KR | 10-0773296 B1 | 11/2007 |
| KR | 10-2008-0062193 A | 7/2008 |
| KR | 10-2008-0097586 A | 11/2008 |
| WO | WO 2008030563 A2 * | 3/2008 |

* cited by examiner

*Primary Examiner* — Grant Sitta
*Assistant Examiner* — Kirk Hermann
(74) *Attorney, Agent, or Firm* — Birch, Stewart, Kolasch & Birch, LLP

(57) ABSTRACT

A terminal for simply selecting one of menus in multitasking operation and displaying the selected menu as an entire image on a screen in consideration of user convenience, and its control method are disclosed. The terminal includes a display module; a user input unit configured to detect a touch input; and a controller configured to slide currently executed menus according to a pre-set method if the input touch continues by longer than a particular time, selecting one of executed screen image of the slid menu, and display it as an entirely magnified image.

17 Claims, 15 Drawing Sheets

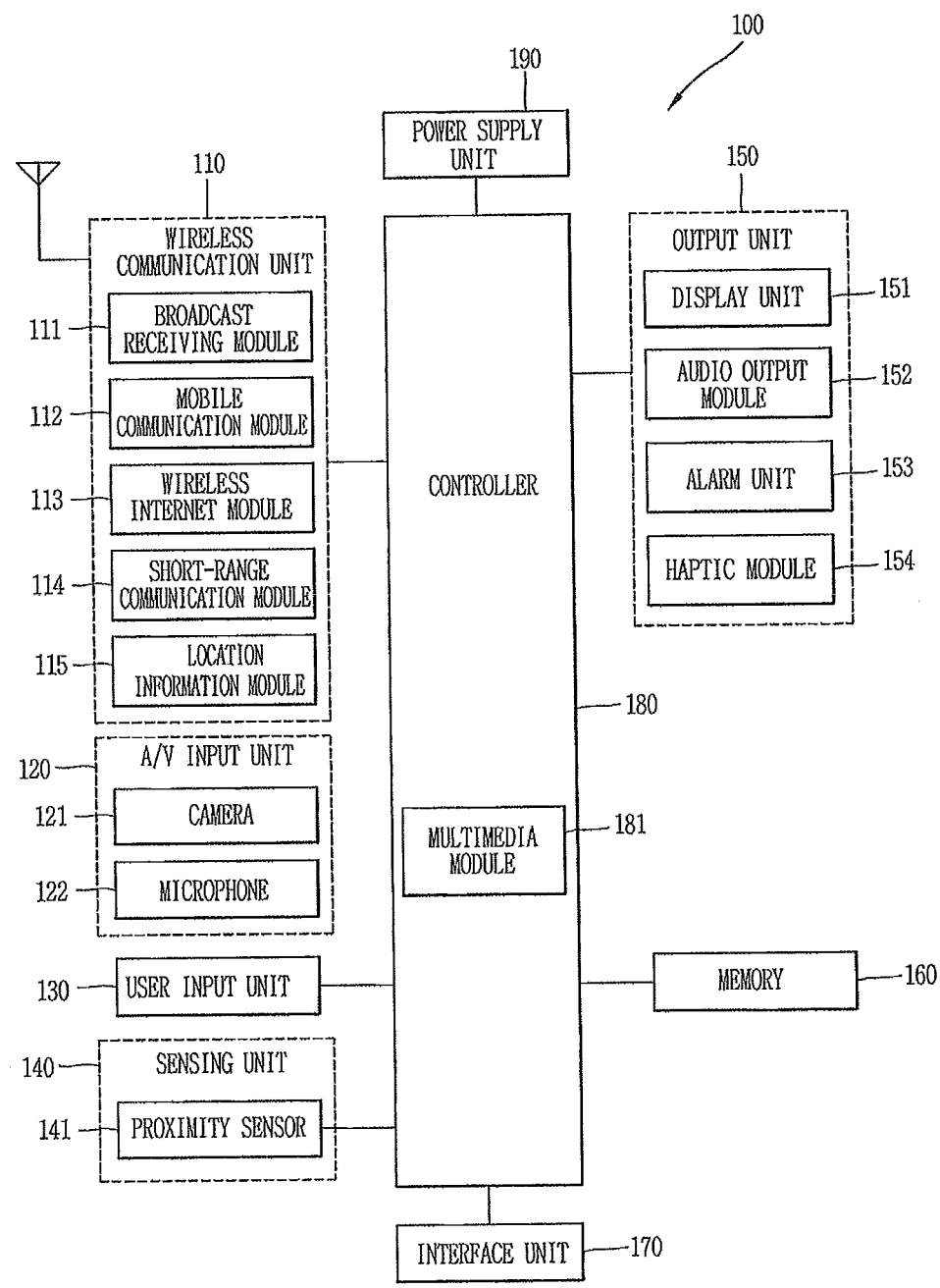

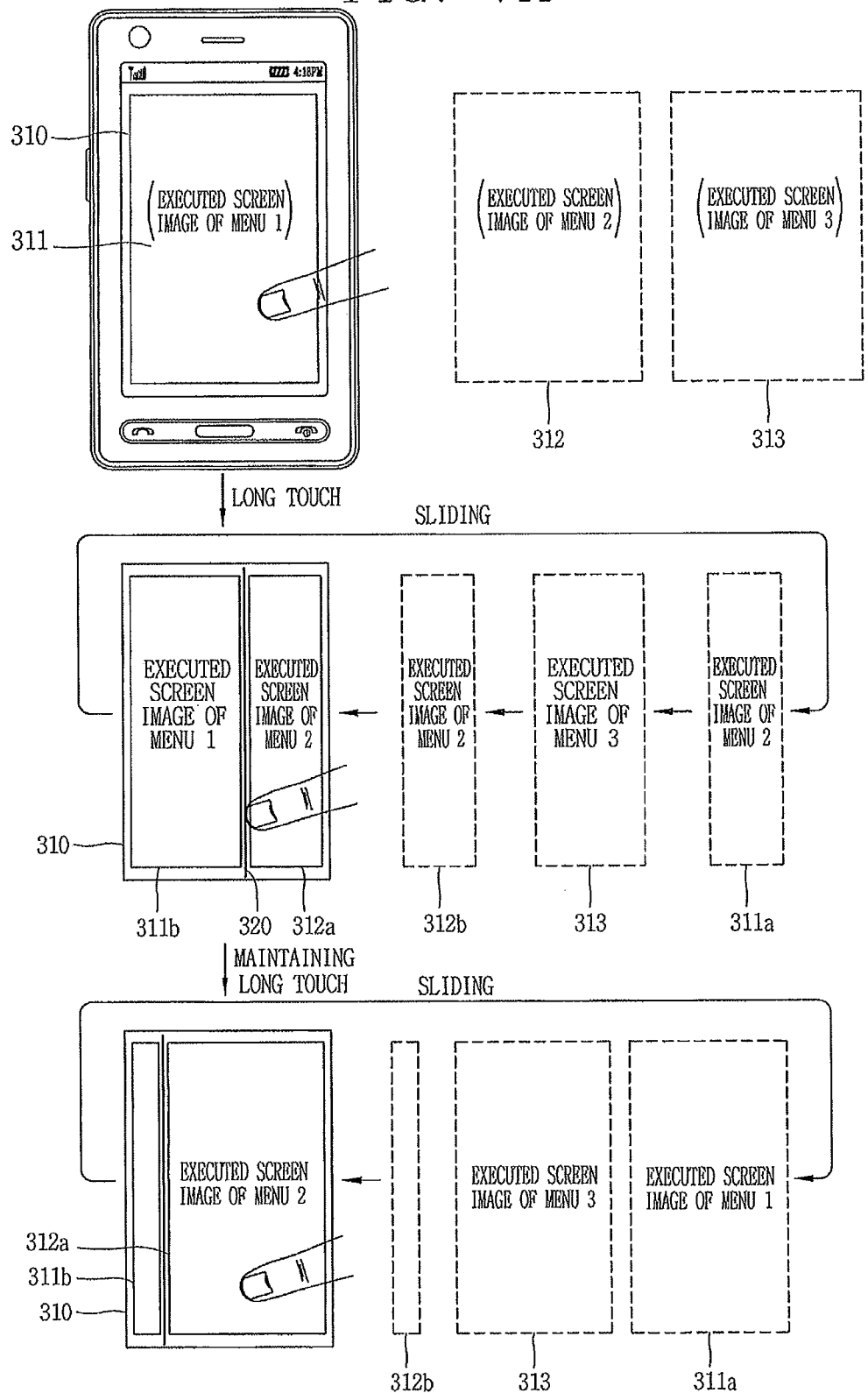

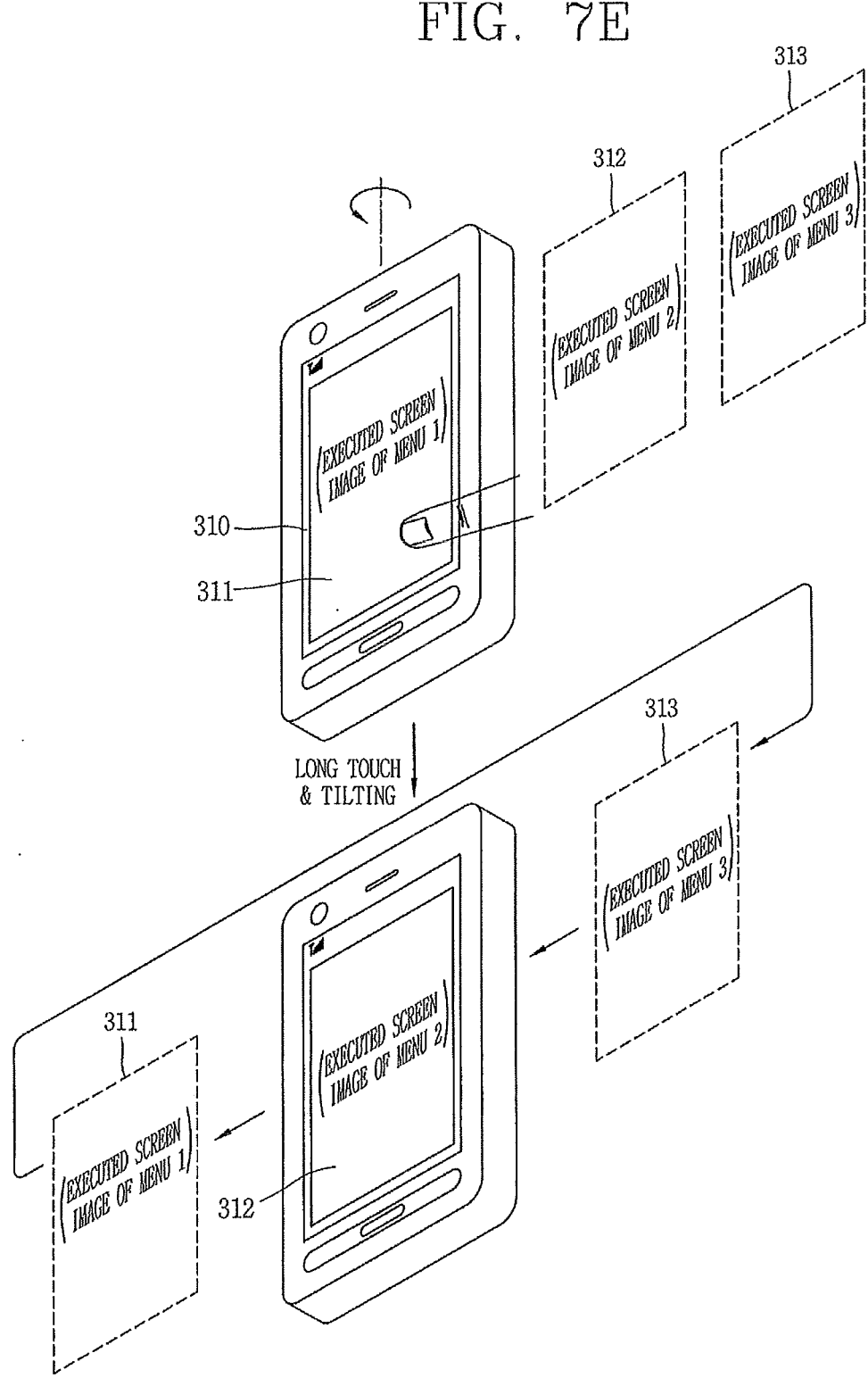

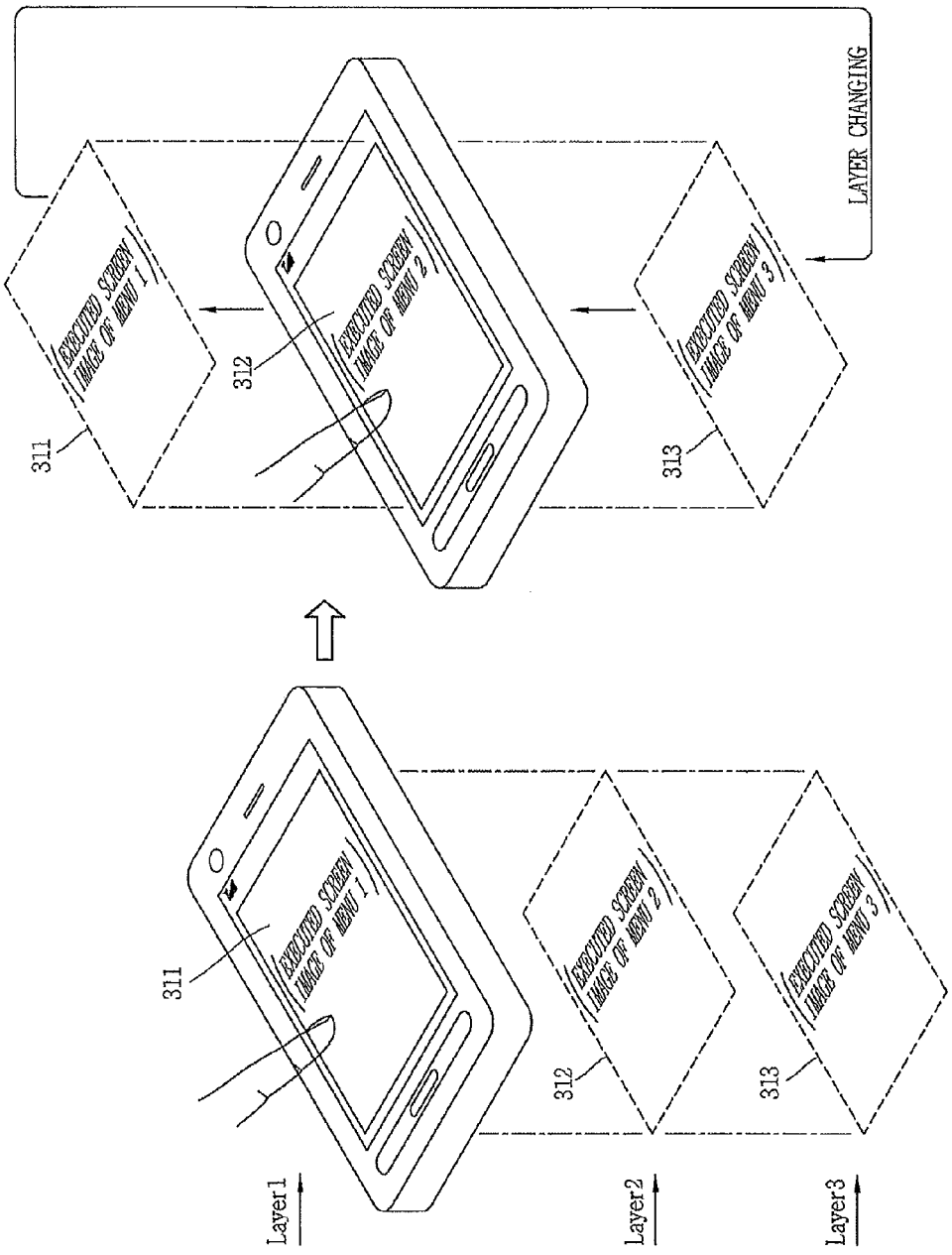

MOBILE TERMINAL AND CONTROL METHOD SLIDABLY DISPLAYING MULTIPLE MENU SCREENS

CROSS REFERENCE TO RELATED APPLICATIONS

The present application claims priority to Korean Application No. 10-2009-0004288 filed in Korea on Jan. 19, 2009, the entire contents of which is hereby incorporated by reference in its entirety.

BACKGROUND OF THE INVENTION

1. Field of the Invention

The present invention relates to a terminal for simply selecting one of menus in multitasking operation and displaying the selected menu as an entire image on a screen in consideration of user convenience, and its control method.

2. Description of the Related Art

Terminals may be divided into a mobile terminal (portable terminal) and a stationary terminal according to whether the terminal is portable or not. The mobile terminals may be divided into a handheld terminal that can be directly carried around and a vehicle mount terminal.

According to diversification of functions, the terminals are implemented in the form of multimedia players having complex functions such as capturing images or video, reproducing music or video files, playing games, receiving broadcasts, etc. In order to support or increase the functions of the terminals, modifications of structural parts and/or software parts of the terminals may be taken into consideration.

Recently, users increasingly want to simultaneously use one or more supplementary functions in a terminal. For example, users tend to want to read a document or send a text message while enjoying music. To satisfy the desire, the number of terminals including a multitasking function increases, and a method for allowing users to conveniently use the multitasking function is required. In particular, a method for minimizing a key input or a menu manipulation while performing multitasking to allow simply selecting one of menus in the multitasking operation.

SUMMARY OF THE INVENTION

Accordingly, one object of the present invention is to address the above-noted and other problems.

Another object of the present invention is to provide a terminal including: a display module; a user input unit configured to detect a touch input; and a controller configured to slide currently executed menus according to a pre-set method if the input touch continues by longer than a particular time, selecting one of executed screen image of the slid menu, and display it as an entirely magnified image.

Still another object of the present invention is to provide a control method of a terminal including: detecting a touch input; sliding currently executed menus according to a pre-set manner according to a way the touch is applied; selecting one of slid menus; and displaying the selected menu as an entirely magnified screen image.

Further scope of applicability of the present invention will become apparent from the detailed description given hereinafter. However, it should be understood that the detailed description and specific examples, while indicating preferred embodiments of the invention, are given by illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings, which are given by illustration only, and thus are not limitative of the present invention, and wherein:

FIG. 1 is a schematic block diagram of a mobile terminal implementing an embodiment of the present invention;

FIGS. 7a to 7f illustrate the method for displaying menus in the multitasking operation according to an embodiment of the present invention.

DETAILED DESCRIPTION OF THE INVENTION

Figure 2A:
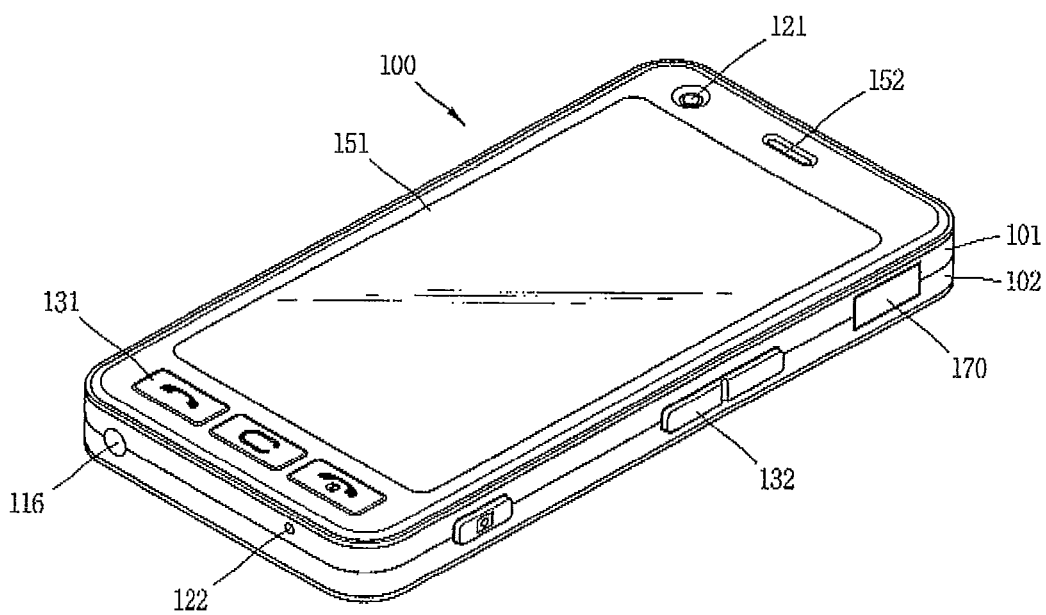
FIG. 2a is a front perspective view of a mobile terminal implementing an embodiment of the present invention.

The present invention provides a terminal for dividing a screen image into sections, and changing content displayed on one section of the screen image to another section of the screen image, and its control method.

The present invention provides a terminal for dividing a screen image into sections, and displaying detailed information selected from one on another section of the screen image, and its control method.

The present invention provides a terminal for dividing a screen image into sections, and sliding the sections of the screen image according to a user manipulation, and its control method.

The present invention provides a terminal for dividing a screen image into sections, and displaying the entire sections or each section in a sliding manner in a desired direction, and its control method.

The present invention provides a terminal for dividing a screen image into sections, simply selecting one of sliding sections and displaying the selected section as an entire screen image, and its control method.

The present invention provides a terminal for dividing a screen image into sections, and displaying the divided sections of the screen image by turns as an entire screen image at particular time intervals while a long touch is being applied, and its control method.

The mobile terminal according to exemplary embodiments of the present invention will now be described with reference to the accompanying drawings. In the following description, usage of suffixes such as 'module', 'part' or 'unit' used for referring to elements is given merely to facilitate explanation of the present invention, without having any significant meaning by itself.

The mobile terminal described in the present invention may include mobile phones, smart phones, notebook computers, digital broadcast terminals, PDAs (Personal Digital Assistants), PMPs (Portable Multimedia Player), navigation devices, etc. However, except for the case where the configuration according to embodiments of the present invention is applicable only to mobile terminals, it would be understood by a person in the art that the present invention can be also applicable to the fixed terminals such as digital TVs, desktop computers, etc.

FIG. 1 is a block diagram of mobile terminal 100 in accordance with an embodiment of the present invention.

The mobile terminal 100 may include a wireless communication unit 110, an A/V (Audio/Video) input unit 120, a user input unit 130, a sensing unit 140, an output unit 150, a memory 160, an interface unit 170, a controller 180, and a power supply unit 190, etc. The components as shown in FIG. 1 are not a requirement, and greater or fewer components may alternatively be implemented.

The components will be described in detail as follows.

The wireless communication unit 110 of FIG. 1 may include one or more components allowing radio communication between the mobile terminal 100 and a wireless communication system or a network in which the mobile terminal is located. For example, the wireless communication unit may include a broadcast receiving module 111, a mobile communication module 112, a wireless Internet module 113, a short-range communication module 114, and a location information module 115, etc.

The broadcast receiving module 111 receives broadcast signals and/or broadcast associated information from an external broadcast management server via a broadcast channel.

The broadcast channel may include a satellite channel and a terrestrial channel. The broadcast management server may refer to a server that generates and transmits a broadcast signal and/or broadcast associated information or a server that receives a previously generated broadcast signal and/or broadcast associated information and transmits the same to a terminal. The broadcast signal may include not only a TV broadcast signal, a radio broadcast signal and a data broadcast signal, but also a broadcast signal obtained by combining a data broadcast signal to the TV or radio broadcast signal.

The broadcast associated information may be information related to a broadcast channel, a broadcast program or a broadcast service provider. The broadcast associated information may be provided via a mobile communication network. In this case, the broadcast associated information may be received by the mobile communication module 112.

The broadcast associated information may exist in various forms. For example, it may exist in the form of an electronic program guide (EPG) of digital multimedia broadcasting (DMB), electronic service guide (ESG) of digital video broadcast-handheld (DVB-H), etc.

The broadcast receiving module 111 may receive digital broadcast signals by using digital broadcast systems such as multimedia broadcasting-terrestrial (DMB-T), digital multimedia broadcasting-satellite (DMB-S), media forward link only (MediaFLO®), digital video broadcast-handheld (DVB-H), integrated services digital broadcast-terrestrial (ISDB-T), etc. The broadcast receiving module 111 may be configured to be suitable for any other broadcast systems as well as the above-described digital broadcast systems.

Broadcast signals and/or broadcast-associated information received via the broadcast receiving module 111 may be stored in the memory 160.

The mobile communication module 112 transmits and receives radio signals to and from at least one of a base station, an external terminal and a server. Such radio signals may include a voice call signal, a video call signal or various types of data according to text/multimedia message transmission and reception.

The wireless Internet module 113 refers to a module for a wireless Internet access. This module may be internally or externally coupled to the terminal. The wireless Internet technique may include a WLAN (Wireless LAN) (Wi-Fi), Wibro (Wireless broadband), Wimax (World Interoperability for Microwave Access), HSDPA (High Speed Downlink Packet Access), etc.

The short-range communication module 114 refers to a module for short-range communication. As the short range communication technologies, Bluetooth, radio frequency identification (RFID), infrared data association (IrDA), ultra-wideband (UWB), ZigBee, etc. may be used.

The location information module 115 is a module for checking or acquiring a location of the mobile terminal. A GPS (Global Positioning System) module is a typical example of the location information module 115.

With reference to FIG. 1, the A/V input unit 120 is configured to receive an audio or video signal. The A/V input unit 120 may include a camera 121, a microphone 122, etc. The camera 121 processes image frames of still pictures or video. The processed image frames may be displayed on a display unit 151.

The image frames processed by the camera 121 may be stored in the memory 160 or transmitted to outside via the wireless communication unit 110. Two or more cameras 121 may be provided according to a usage environment.

The microphone 122 receives an external audio signal while in a phone call mode, a recording mode, a voice recognition mode, etc., and processes it into electrical audio data. The processed audio data may be converted for output into a format transmittable to a mobile communication base station via the mobile communication module 112 in case of the phone call mode. The microphone 122 may include various types of noise canceling algorithms to cancel noise generated in the course of receiving and transmitting external audio signals.

The user input unit 130 generates input data to control an operation of the mobile terminal. The user input unit 130 may include a keypad, a dome switch, a touch pad (e.g., static pressure/capacitance), a jog wheel, a jog switch, etc.

The sensing unit 140 detects a current status of the mobile terminal 100 such as an opened or closed state of the mobile terminal 100, a location of the mobile terminal 100, a presence or absence of user contact with the mobile terminal 100, orientation of the mobile terminal 100, an acceleration or deceleration movement of the mobile terminal 100, etc., and generates a sensing signal for controlling the operation of the mobile terminal 100. For example, when the mobile terminal 100 is a slide type mobile phone, the sensing unit 140 may sense whether the slide phone is opened or closed. In addition, the sensing unit 140 can detect whether or not the power supply unit 190 supplies power or whether or not the interface unit 170 is coupled with an external device. The sensing unit 140 may include a proximity sensor 141.

The output unit 150 generates an output related to the sense of sight, the sense of hearing or the sense of touch and may include the display unit 151, the audio output module 152, the alarm unit 153, and a haptic module 154.

The display unit 151 displays (outputs) information processed in the mobile terminal 100. For example, when the mobile terminal 100 is in a phone call mode, the display unit 151 displays a User Interface (UI) or a Graphic User Interface (GUI) associated with a call. When the mobile terminal 100 is in a video call mode or image capturing mode, the display unit 151 may display a captured image and/or received image, a UI or GUI.

The display unit 151 may include at least one of a Liquid Crystal Display (LCD), a Thin Film Transistor-LCD (TFT-LCD), an Organic Light Emitting Diode (OLED), a flexible display and a three-dimensional (3D) display.

Some of them may be configured to be transparent to allow viewing of the exterior therethrough, which may be called transparent displays. A typical transparent display may be, for example, a TOLED (Transparent Organic Light Emitting Diode), or the like. The rear structure of the display unit 151 may include the light transmissive structure. With such a structure, the user can view an object located at a rear side of the terminal body through the region occupied by the display unit 151 of the terminal body.

The mobile terminal 100 may include two or more display units according to its embodiment. For example, a plurality of display units may be separately or integrally disposed on one surface or disposed on both surfaces of the mobile terminal, respectively.

When the display unit 151 and a sensor (referred to as a 'touch sensor', hereinafter) are overlaid in a layered manner (referred to as a 'touch screen', hereinafter), the display unit 151 may be used as both an input device and an output device. The touch sensor may have the form of, for example, a touch film, a touch sheet, a touch pad, etc.

The touch sensor may be configured to convert a pressure applied to a particular portion of the display unit 151 or a change in capacitance at a particular portion of the display unit 151 into an electrical input signal. The touch sensor may be configured to detect the pressure when a touch is applied, as well as a touched position or area.

When a touch with respect to the touch sensor is inputted, corresponding signal (signals) are transmitted to a touch controller. The touch controller processes the signal (signals) and transmits corresponding data to the controller 180. Thus, the controller 180 can recognize which portion of the display unit 151 has been touched.

With reference to FIG. 1, a proximity sensor 141 may be disposed within the mobile terminal covered by the touch screen or near the touch screen. The proximity sensor 141 refers to a sensor for detecting the presence or absence of an object that accesses a certain detect surface or an object that exists nearby by using the force of electromagnetism or infrared rays without a mechanical contact. Thus, the proximity sensor 141 has a longer life span compared with a contact type sensor, and it can be utilized for various purposes.

The example of the proximity sensor 141 may be a transmission type photo sensor, a direct reflection type photo sensor, a mirror-reflection type photo sensor, an RF oscillation type proximity sensor, a capacitance type proximity sensor, a magnetic proximity sensor, an infrared proximity sensor. When the touch screen is an electrostatic type touch screen, an approach of the pointer is detected based on a change in an electric field according to the approach of the pointer. In this case, the touch screen (touch sensor) may be classified as a proximity sensor.

In the following description, for the sake of brevity, recognition of the pointer positioned to be close to the touch screen without being contacted will be called a 'proximity touch', while recognition of actual contacting of the pointer on the touch screen will be called a 'contact touch'. In this case, when the pointer is in the state of the proximity touch, it means that the pointer is positioned to correspond vertically to the touch screen.

The proximity sensor 141 detects a proximity touch and a proximity touch pattern (e.g., a proximity touch distance, a proximity touch speed, a proximity touch time, a proximity touch position, a proximity touch movement state, or the like), and information corresponding to the detected proximity touch operation and the proximity touch pattern can be outputted to the touch screen.

The audio output module 152 may output audio data received from the wireless communication unit 110 or stored in the memory 160 in a call signal reception mode, a call mode, a record mode, a voice recognition mode, a broadcast reception mode, and the like. Also, the audio output module 152 may provide audible outputs related to a particular function (e.g., a call signal reception sound, a message reception sound, etc.) performed in the mobile terminal 100. The audio output module 152 may include a receiver, a speaker, a buzzer, etc.

The alarm unit 153 outputs a signal for informing about an occurrence of an event of the mobile terminal 100. Events generated in the mobile terminal may include call signal reception, message reception, key signal inputs, a touch input etc. In addition to video or audio signals, the alarm unit 153 may output signals in a different manner, for example, to inform about an occurrence of an event. The video or audio signals may be also outputted via the audio output module 152, so the display unit 151 and the audio output module 152 may be classified as parts of the alarm unit 153.

A haptic module 154 generates various tactile effects the user may feel. A typical example of the tactile effects generated by the haptic module 154 is vibration. The strength and pattern of the haptic module 154 can be controlled. For example, different vibrations may be combined to be outputted or sequentially outputted.

Besides vibration, the haptic module 154 may generate various other tactile effects such as an effect by stimulation such as a pin arrangement vertically moving with respect to a contact skin, a spray force or suction force of air through a jet orifice or a suction opening, a contact on the skin, a contact of an electrode, electrostatic force, etc., an effect by reproducing the sense of cold and warmth using an element that can absorb or generate heat.

The haptic module 154 may be implemented to allow the user to feel a tactile effect through a muscle sensation such as fingers or arm of the user, as well as transferring the tactile effect through a direct contact. Two or more haptic modules 154 may be provided according to the configuration of the mobile terminal 100.

The memory 160 may store software programs used for the processing and controlling operations performed by the controller 180, or may temporarily store data (e.g., a phonebook, messages, still images, video, etc.) that are inputted or outputted. In addition, the memory 160 may store data regarding various patterns of vibrations and audio signals outputted when a touch is inputted to the touch screen.

The memory 160 may include at least one type of storage medium including a Flash memory, a hard disk, a multimedia card micro type, a card-type memory (e.g., SD or DX memory, etc), a Random Access Memory (RAM), a Static Random Access Memory (SRAM), a Read-Only Memory (ROM), an Electrically Erasable Programmable Read-Only Memory (EEPROM), a Programmable Read-Only memory (PROM), a magnetic memory, a magnetic disk, and an optical disk. Also, the mobile terminal 100 may be operated in relation to a web storage device that performs the storage function of the memory 160 over the Internet.

The interface unit 170 serves as an interface with every external device connected with the mobile terminal 100. For example, the external devices may transmit data to an external device, receives and transmits power to each element of the mobile terminal 100, or transmits internal data of the mobile terminal 100 to an external device. For example, the interface unit 170 may include wired or wireless headset ports, external power supply ports, wired or wireless data ports, memory card ports, ports for connecting a device having an identification module, audio input/output (I/O) ports, video I/O ports, earphone ports, or the like.

The identification module may be a chip that stores various information for authenticating the authority of using the mobile terminal 100 and may include a user identity module (UIM), a subscriber identity module (SIM) a universal subscriber identity module (USIM), and the like. In addition, the device having the identification module (referred to as 'identifying device', hereinafter) may take the form of a smart card. Accordingly, the identifying device may be connected with the terminal 100 via a port.

When the mobile terminal 100 is connected with an external cradle, the interface unit 170 may serve as a passage to allow power from the cradle to be supplied therethrough to the mobile terminal 100 or may serve as a passage to allow various command signals inputted by the user from the cradle to be transferred to the mobile terminal therethrough. Various command signals or power inputted from the cradle may operate as signals for recognizing that the mobile terminal is properly mounted on the cradle.

The controller 180 typically controls the general operations of the mobile terminal. For example, the controller 180 performs controlling and processing associated with voice calls, data communications, video calls, and the like. The controller 180 may include a multimedia module 181 for reproducing multimedia data. The multimedia module 181 may be configured within the controller 180 or may be configured to be separated from the controller 180.

The controller 180 may perform a pattern recognition processing to recognize a handwriting input or a picture drawing input performed on the touch screen as characters or images, respectively.

The power supply unit 190 receives external power or internal power and supplies appropriate power required for operating respective elements and components under the control of the controller 180.

Various embodiments described herein may be implemented in a computer-readable or its similar medium using, for example, software, hardware, or any combination thereof.

For hardware implementation, the embodiments described herein may be implemented by using at least one of application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic units designed to perform the functions described herein. In some cases, such embodiments may be implemented by the controller 180 itself.

For software implementation, the embodiments such as procedures or functions may be implemented together with separate software modules that allow performing of at least one function or operation. Software codes can be implemented by a software application (or program) written in any suitable programming language. The software codes may be stored in the memory 160 and executed by the controller 180.

FIG. 2a is a front perspective view of the mobile terminal according to an embodiment of the present invention.

The mobile terminal has a bar type terminal body. However, the present invention is not limited thereto and may be applicable to a slide type mobile terminal, a folder type mobile terminal, a swing type mobile terminal, a swivel type mobile terminal, etc, in which two or more bodies are combined to be relatively movable.

The body includes a case (or casing, housing, cover, etc.) constituting the external appearance. In this embodiment, the case may include a front case 101 and a rear case 102. Various electronic components are installed in the space between the front case 101 and the rear case 102. One or more intermediate cases may be additionally disposed between the front case 101 and the rear case 102.

The cases may be formed by injection-molding a synthetic resin or may be made of a metallic material such as stainless steel (STS) or titanium (Ti), etc.

The display unit 151, the audio output module 152, the camera 121, the user input unit 130, 131, 132, the microphone 122, the interface unit 170, etc. may be disposed mainly on the front case 101.

The display unit 151 takes most portion of a circumferential surface of the front case 101. The audio output unit 151 and the camera 121 are disposed at a region adjacent to one end portion among both end portions of the display unit 151, and the user input unit 131 and the microphone 122 are disposed at a region adjacent to another end portion. The user input unit 132 and the interface unit 170 may be disposed at the sides of the front case 101 and the rear case 102.

The user input unit 130 in FIG. 1 is manipulated to receive a command for controlling the operation of the mobile terminal 100 and may include a plurality of manipulation units 131 and 132. The manipulation units 131 and 132 may be generally referred to as a manipulating portion, and various methods and techniques can be employed for the manipulation portion so long as they can be operated by the user in a tactile manner.

Content inputted by the first and second manipulation units 131 and 132 can be variably set. For example, the first manipulation unit 131 may receive a command such as starting, ending, scrolling, etc., and the second manipulation unit 32 may receive a command such as controlling of the size of a sound outputted from the audio output unit 152 or conversion into a touch recognition mode of the display unit 151.

Figure 2B:
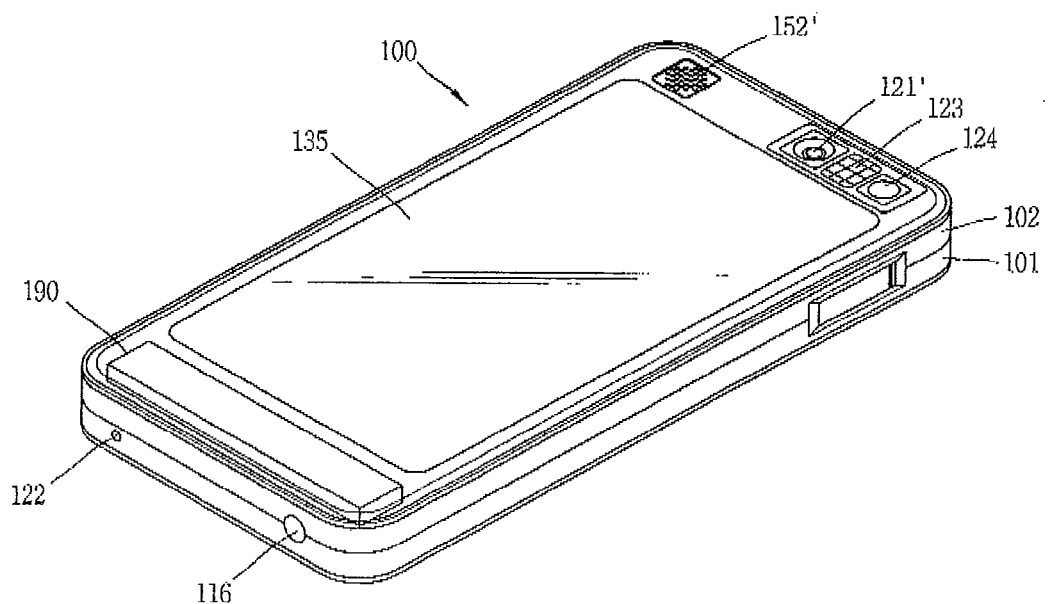
FIG. 2b is a rear perspective view of a mobile terminal implementing an embodiment of the present invention.

FIG. 2b is a rear perspective view of the mobile terminal as shown in FIG. 2a.

With reference to FIG. 2b, a camera 121' may additionally be disposed on the rear surface of the terminal body, namely, on the rear case 102. The camera 121' may have an image capture direction which is substantially opposite to that of the camera 121 (See FIG. 2a), and have a different number of pixels than the camera 121.

For example, the camera 121 may have a smaller number of pixels to capture an image of the user's face and transmit such image to another party, and the camera 121' may have a larger number of pixels to capture an image of a general object and not immediately transmit it in most cases. The cameras 121 and 121' may be installed on the terminal body such that they can be rotatable or popped up.

A flash 123 and a mirror 124 may be additionally disposed adjacent to the camera 121'. When an image of a subject is captured with the camera 121', the flash 123 illuminates the subject. The mirror 124 allows the user to view themselves when the user wants to capture their own image (i.e., self-image capturing) by using the camera 121'.

An audio output unit 152' may be additionally disposed on the rear surface of the terminal body. The audio output module 152' may implement stereophonic sound functions in conjunction with the audio output module 152 (See FIG. 2a) and may be also used for implementing a speaker phone mode for call communication.

A broadcast signal receiving antenna 116 may be disposed at the side of the terminal body, in addition to an antenna that is used for mobile communications. The antenna 116 constituting a portion of the broadcast receiving module 111 (See FIG. 1) can also be configured to be retractable from the terminal body.

The power supply unit 190 for supplying power to the mobile terminal 100 is mounted on the terminal body. The power supply unit 190 may be installed within the terminal body or may be directly attached to or detached from the exterior of the terminal body.

A touch pad 135 for detecting a touch may be additionally mounted on the rear case 102. The touch pad 135 may be configured to be light transmissive like the display unit 151. In this case, when the display unit 151 is configured to output visual information from both sides thereof, the visual information may be recognized also via the touch pad 135. Alternatively, a display may be additionally mounted on the touch pad so that a touch screen may be disposed on the rear case 102.

The touch pad 135 is operated in association with the display unit 151 of the front case 101. The touch pad 135 may be disposed to be parallel on the rear side of the display unit 151. The touch pad 135 may have the same size as the display unit 151 or smaller.

The associated operation method of the display unit 151 and the touch pad 135 will now be described with reference to FIGS. 3a and 3b.

Figure 3A:
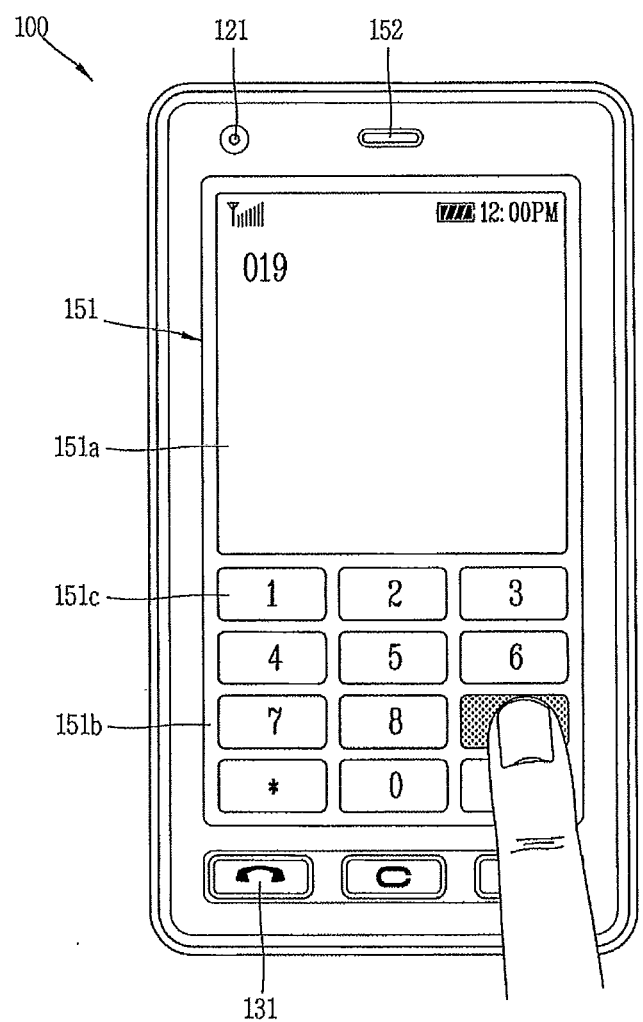
FIGS. 3a and 3b are front views of the mobile terminal for explaining operational states of the mobile terminal according to an embodiment of the present invention.
Figure 3B:
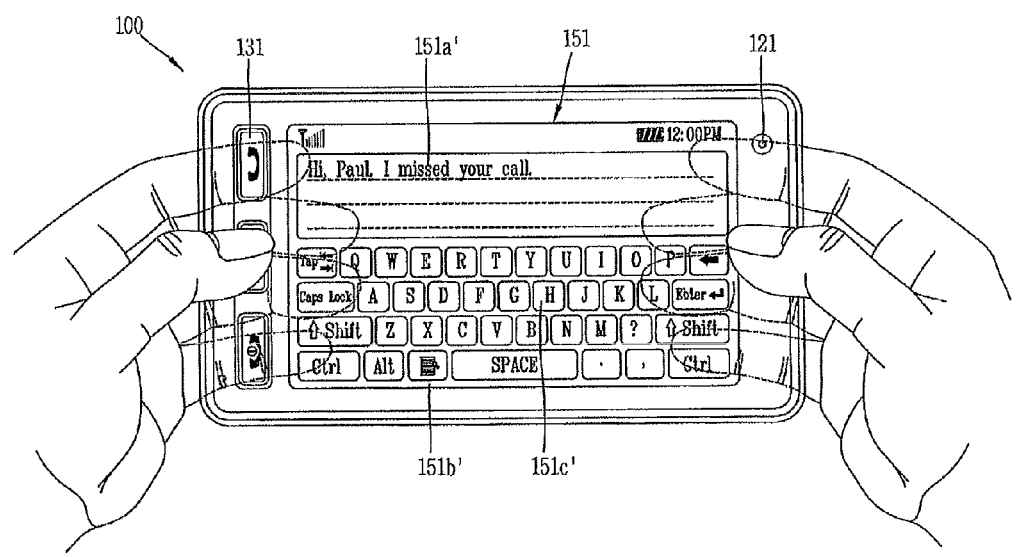

FIGS. 3a and 3b are front views of the mobile terminal for explaining an operation state of the mobile terminal according to the present invention.

Various types of visual information may be displayed on the display unit 151. The information may be displayed in the form of character, number, symbol, graphic, icon, etc.

In order to input the information, at least one of the character, number, symbol, graphic and icon is displayed in a certain arrangement so as to be implemented in the form of a keypad. Such keypad may be so-called 'soft key'.

FIG. 3a shows receiving a touch applied to a soft key on the front surface of the terminal body.

The display unit 151 may be operated as a whole region or may be divided into a plurality of regions and accordingly operated. In the latter case, the plurality of regions may be operation in association with each other.

For example, an output window 151a and an input window 151b may be displayed at upper and lower portions of the display unit 151, respectively. The output window 151a and the input window 151b are allocated to output or input information, respectively. Soft keys 151c including numbers for inputting a phone number or the like are outputted on the input window 151b. When the soft key 151c is touched, a number corresponding to the touched soft key is displayed on the output window 151a. When the first manipulation unit 131 is manipulated, a call connection with respect to a phone number displayed on the output window 151a is attempted.

FIG. 3b shows receiving of a touch applied to the soft key through the rear surface of the terminal body. If FIG. 3a shows a portrait in which the terminal body is disposed vertically, FIG. 3b shows a landscape in which the terminal body is disposed horizontally. The display unit 151 may be configured to convert an output screen image according to the disposition direction of the terminal body.

FIG. 3b shows an operation of a text input mode in the mobile terminal. An output window 151a' and an input window 151b' are displayed on the display unit 151. A plurality of soft keys 151c' including at least one of characters, symbols and numbers may be arranged on the input window 151b'. The soft keys 151c' may be arranged in the form of Qwerty keys.

When the soft keys 151c' are touched through the touch pad 135 (See FIG. 2b), characters, numbers, symbols, or the like, corresponding to the touched soft keys are displayed on the output window 151a'. Compared with a touch input through the display unit 151, a touch input through the touch pad 135 can advantageously prevent the soft keys 151c' from being covered by user's fingers when touching is made. When the display unit 151 and the touch pad 135 are formed to be transparent, the user's fingers put on the rear surface of the terminal body can be viewed with naked eyes, so the touch input can be more accurately performed.

Besides the input methods presented in the above-described embodiments, the display unit 151 or the touch pad 135 may be configured to receive a touch through scrolling. The user may move a cursor or a pointer positioned on an entity, e.g., an icon or the like, displayed on the display unit 151 by scrolling the display unit 151 or the touch pad 135. In addition, when the user moves his fingers on the display unit 151 or the touch pad 135, the path along which the user's fingers move may be visually displayed on the display unit 151. This would be useful in editing an image displayed on the display unit 151.

One function of the terminal may be executed in case where the display unit 151 (touch screen) and the touch pad 135 are touched together within a certain time range. The both touches may be clamping the terminal body with the user's thumb and index finger. The one function may be, for example, activation or deactivation of the display unit 151 or the touch pad 135.

The proximity sensor 141 will now be described in detail with reference to FIGS. 1 and 4.

Figure 4:
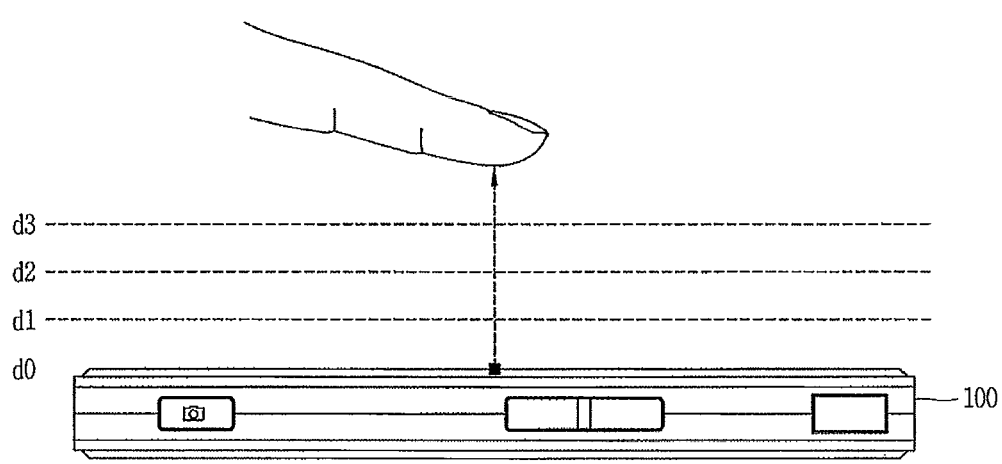
FIG. 4 is a conceptual view for explaining a proximity depth of a proximity sensor.

FIG. 4 is a conceptual view for explaining the depth of proximity of the proximity sensor.

As shown in FIG. 4, when a pointer such as the user's finger, a pen, or the like, approaches the touch screen, the proximity sensor 141 disposed within or near the touch screen detects it and outputs a proximity signal.

The proximity sensor 141 may be configured to output a different proximity signal according to the distance (referred to as a 'proximity depth', hereinafter) between the closely touched pointer and the touch screen.

FIG. 4 shows the section of the touch screen with the proximity sensor for detecting, for example, three proximity depths. The proximity sensor may detect three or less or four or more proximity depths.

In detail, when the pointer is completely brought into contact with the touch screen at d0, it is recognized as a contact touch. When the pointer is positioned to be spaced apart by shorter than a distance d1 on the touch screen, it is recognized as a proximity touch with a first proximity depth. If the pointer is positioned to be spaced apart by the distance longer than the distance d1 but shorter than a distance d2 on the touch screen, it is recognized as a proximity touch with a second proximity depth. If the pointer is positioned to be spaced apart by the distance longer than the distance d2 but shorter than a distance d3, it is recognized as a proximity touch with a third proximity depth. If the pointer is positioned to be spaced apart by longer than the distance d3 on the touch screen, it is recognized that the proximity touch has been released.

Accordingly, the controller 180 may recognize the proximity touches as various input signals according to the proximity depths and proximity positions of the pointer, and may control various operations according to the various input signals.

Figure 5:
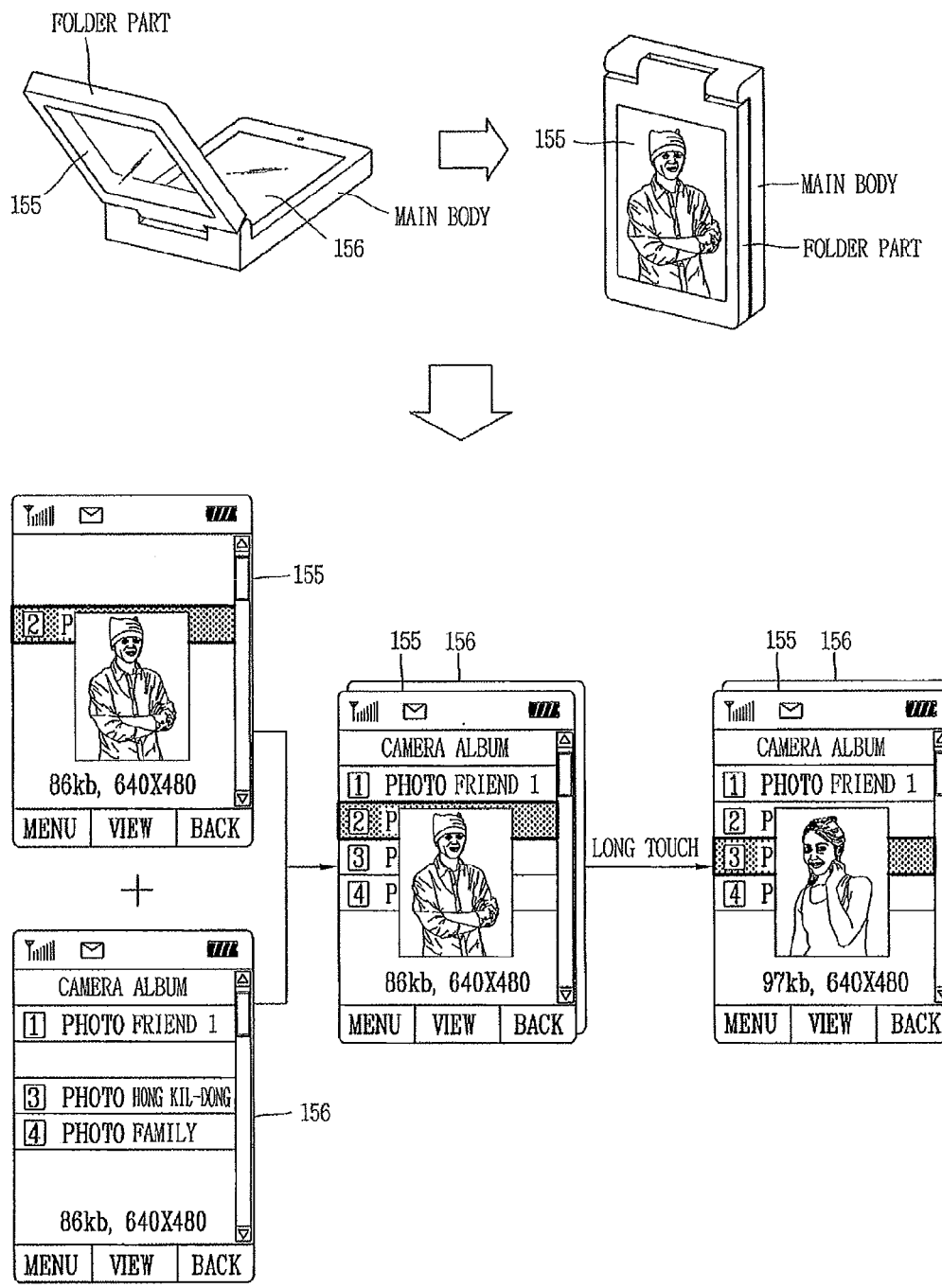
FIG. 5 is a conceptual view for explaining a method for controlling a touch operation in a configuration that a pair of display units overlap with each other.

FIG. 5 is a conceptual view for explaining a method for controlling a touch operation in a configuration that a pair of display units 155 and 156 overlap with each other.

The terminal shown in FIG. 5 is a folder type terminal in which a folder part is foldably connected with the main body. The first display unit 155 mounted on the folder part may be light-transmissive or transparent such as a TOLED, while the second display unit 156 mounted on the main body may not allow light transmission such as an LCD. The first and second display units 155 and 156 may be configured as a touch screen through which a touch can be applied.

For example, when a touch (contact touch or a proximity touch) with the TOLED is detected, the controller 180 may provide control to select or run at least one image on an image list displayed on the TOLED 155 according to a type of the touch or a touch duration.

Hereinafter, a method for controlling information displayed on a different display unit or on the LCD 156 when a touch is applied to the TOLED 155 exposed in an overlaid configuration will now be described based on input methods discriminated by a touch, a long touch, a long touch & dragging, and the like.

In the overlaid configuration (i.e., the mobile terminal is in a closed configuration), the TOLED 155 is disposed to be overlaid on the LCD 156. In this configuration, if a touch, namely, a long touch (e.g., a touch continued for longer than two or three seconds), which is different from the touch for controlling the image displayed on the TOLED 155, is detected, the controller 180 controls to select at least one image on the image list displayed on the LCD 156 according to the detected touch input. The result according to execution of the selected image is displayed on the TOLED 155.

The long touch may be used to selectively move a desired one of the entities displayed on the LCD 156 to the TOLED 155 (without execution a corresponding operation). Namely, when the user makes a long touch on one region of the TOLED 155 corresponding to a particular entity of the LCD 156, the controller 180 controls to move the corresponding entity to the TOLED 155 and display it on the TOLED 155. Meanwhile, an entity displayed on the TOLED 155 may be also moved to be displayed the LCD 156 according to a certain touch input, e.g., flicking, swirling, or the like, with respect to the TOLED 155. FIG. 5 shows the case where the menu No. 2 displayed on the LCD 156 has been moved to be displayed on the TOLED 155.

When a drag is detected together with a long touch, the controller may control to display, for example, a preview screen image of a selected image according to a function related to the image selected by the long touch on the TOLED 155. FIG. 5 shows the case where a preview (a photo image of a man) of the menu No. 2 (image file) has been performed.

With the preview screen image outputted, when dragging is additionally made on the TOLED 155 while the long touch is maintained, the controller moves a select cursor (or a select bar) of the LCD 156 and displays an image selected by the select cursor on a preview screen (a photo image of a woman). Thereafter, when the touch (long touch and dragging) ends, the controller 180 displays the first image selected by the long touch.

The touch operation (long touch and dragging) can be applied in the same manner when a sliding operation (an operation of a proximity touch corresponding to the dragging) together with a long proximity touch (i.e., a proximity touch continued for longer than at least two to three seconds).

When a touch operation other than the above-described operation is detected, the controller 180 may perform an operation in the same manner as the general touch control method.

A control method for a touch operation in the overlap form may be applied to a terminal having a single display. In addition, the control method can be also applicable to a folder type terminal having a dual-display and other terminals.

A control method implemented by the terminal configured as described above according to exemplary embodiments of the present invention will now be described with reference to the accompanying drawings. The embodiments of the present invention may be used solely or may be combined to be used. In addition, the embodiments of the present invention may be combined with the UI as described above so as to be used.

A control method of the terminal according to embodiments of the present invention will now be described.

Figure 6:
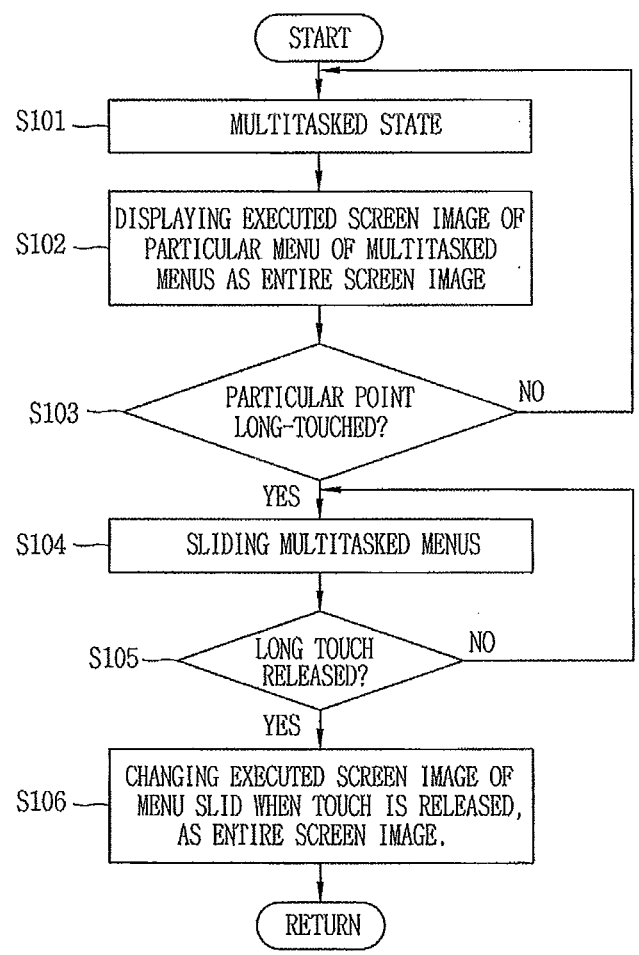
FIG. 6 is a flow chart illustrating the process of a method for selecting one of menus in a multitasking operation according to an embodiment of the present invention.

FIG. 6 is a flow chart illustrating the process of a method for selecting one of menus in a multitasking operation according to an embodiment of the present invention.

In the present embodiment, it is assumed that two or more functions (or menus) are executed in a multitasking manner (S101). It is also assumed that an executed screen image of one of the multitasked functions (or menus) is currently displayed as an entire screen image (S102).

The controller 180 may display information of the multitasked functions (e.g., the number of multitasked functions) at an arbitrary region (e.g., an indicator display region). When two or more functions are multitasked, the user may display the executed functions to simply select one of the multitasked functions. Namely, in the present invention, the number of key inputs or touch inputs for selecting functions may be reduced. For example, without inputting a particular key for displaying a list of multitasked functions or a particular key for scrolling the function list, one of the functions can be simply selected, and an executed screen image of the selected function can be simply changed to an entire screen image so as to be displayed.

The controller 180 detects whether or not a particular point of the function executed screen image is long-touched by the user (S103). If the user touches a particular point of the screen image for a long time, the controller 180 slides the executed screen images of the multitasked functions according to a pre-set method (S104). And, the controller 180 detects whether the long touch is released (S105).

When the long touch is released, the controller 180 determines that a particular function on the sliding has been selected by the user, and displays an executed screen image of the selected particular function as an entire screen image (S106).

In this case, in order to select one of the multitasked functions, the user may input a manipulation in addition to the long touch to display the executed screen images of the functions and at the same to select one of the executed screen images of the functions. For example, the user may perform flicking as the additionally inputted manipulation on a particular point of a screen image. Or, the user may apply an impact stronger than a particular strength to one side of the terminal. Alternatively, the user may tilt a particular face downwardly.

The long touch may be detected by the user input unit, and the impact or tilting may be detected by the sensing unit. The additionally input manipulation may be performed at the same time when the long touch is inputted, or may be successively inputted following the long touch input. The sliding method may be changed according to the additionally input manipulation. For example, the menus may be successively slid or may be slid in unit of one function executed screen image. The method of selecting of the function executed screen image may be changed according to the sliding method.

The additionally input manipulation may be performed in a long touch state or without a long touch according to a pre-set environment setting option (not shown). Time duration for recognizing a long touch may be changed according to the environment setting option. For example, the time duration for recognizing the long touch may be changed to be shorter according to an additionally inputted manipulation (e.g., flicking operation).

FIGS. 7a to 7f illustrate the method for displaying menus in the multitasking operation according to an embodiment of the present invention.

In the following embodiments, it is assumed that two or more menus (e.g., menus 1, 2, and 3) are multitasked and an executed screen image 311 of one (e.g, menu 1) of the menus is displayed on the entire screen 310. Executed screen images of the other menus (e.g., menus 2 and 3) excluded from displaying are displayed as virtual screen images (frames indicated by dotted lines). Hereinafter, executed screen images that is not closely related to the technical gist of the present invention may be omitted or simply illustrated.

With reference to FIG. 7a, it is assumed that the executed screen image 311 of the particular menu (e.g., menu 1) among the multitasked menus is displayed on the entire screen 310 and the user performs long-touch on a particular point of the executed screen image 311 by longer than a pre-set particular time.

When the particular point of the screen is long-touched, the controller 180 may successively slide the multitasked menus in a particular direction set as a default. Or, the controller 180 may slide the multitasked menus in a user-set direction.

The executed screen images 311, 312, and 313 of the sliding menus are displayed in a continuously circulated manner. In this case, when the executed screen images are divided according to the sliding operation, reference letters 'a' or 'b' are added to the same reference numerals for discrimination.

The menus may be successively slid in the form of executed screen images, not in the form of a simple list. In this case, the executed screen images may be slid with their size remained unchanged. Or, the executed screen images may be slid with their size reduced. In this case, information (e.g., a discrimination line, an empty space, a frame of each executed screen image) 320 for discriminating the slid executed screen images may be additionally displayed.

When the slid executed screen image is displayed on the entire screen, the sliding operation may be suspended for a particular time, and then after the particular time lapses, the sliding operation may be resumed. The time interval for the sliding operation of the menus may be set as a default or may be changed by the user according to an environment setting.

Figure 7B:
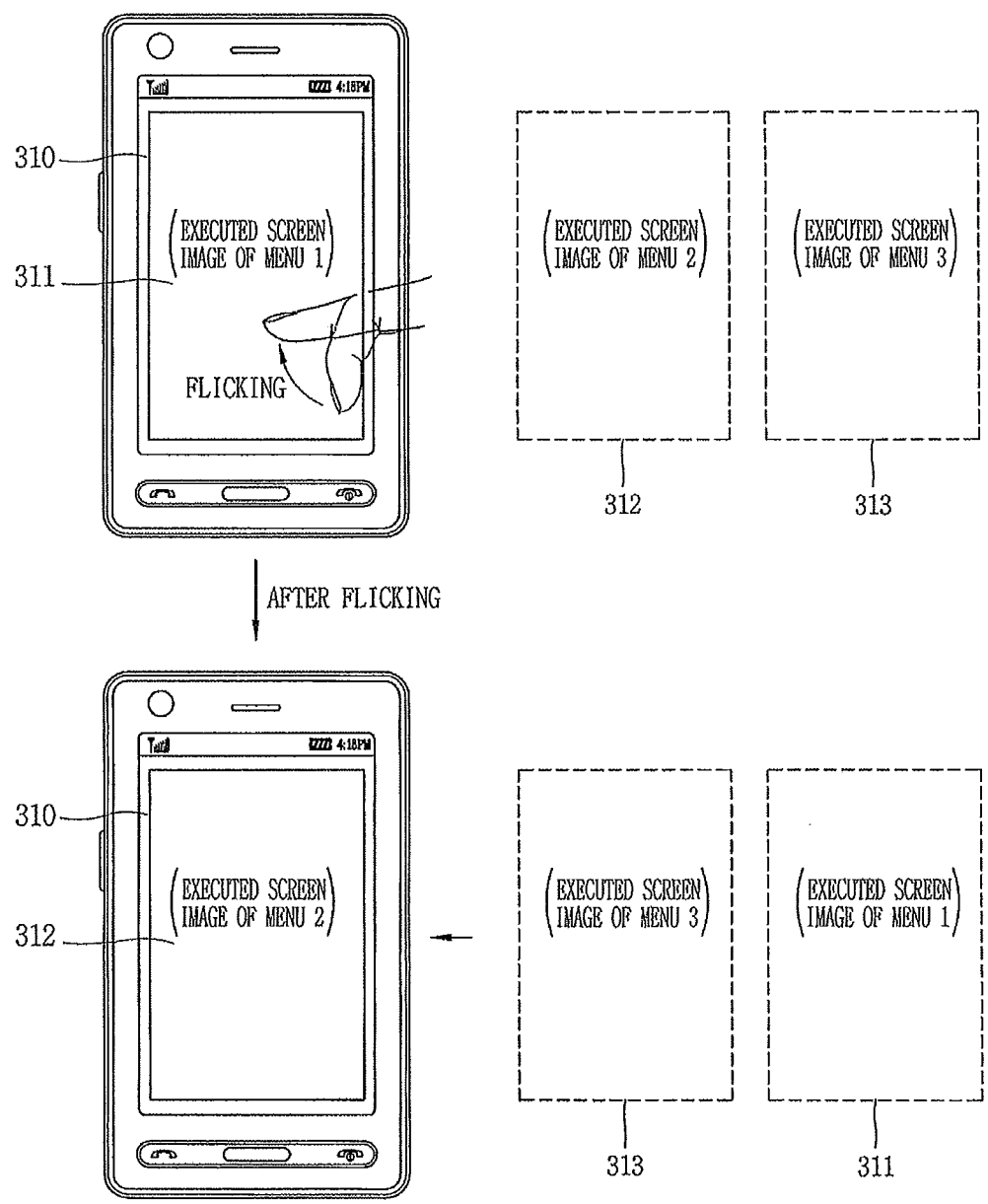

With reference to FIG. 7b, the user may perform flicking in a particular direction while touching a particular point of the screen image.

When the particular point of the screen image is flicked, the controller 180 may slide the multitasked menus in the flicked particular direction. The menus may be slid one by one according to a pre-set certain order each time flicking is performed.

Namely, with the executed screen image 311 displayed on the entire screen 310, when the user performs flicking in a state that he performs long-touch on a particular point, the controller 180 displays the executed screen image 312 of the menu 2 on the entire screen 310. Each time flicking is performed, the executed screen image of one menu is continuously changed to an executed screen image of another menu.

The menus may be slid in the form of the executed screen image as mentioned above, and when the menus are slid, the size of the executed screen images may be scaled down.

The flicking operations refers to an input method of pushing up the screen image with the user's finger in a flick manner. After the screen image is pushed up in a flick manner in the touched state, when the touch is released, the controller 180 immediately determine whether or not flicking has been performed through one of information such as time, a drag speed, a drag direction, a drag length, a touch pressure or by combining two or more of those information.

When the menu executed screen image is changed according to the flicking operation, the changed menu executed screen image is maintained as being displayed on the entire screen unless any additional flicking operation is performed. Namely, an operation for outputting a menu list or selecting one menu from the list may not be additionally performed.

Figure 7C:
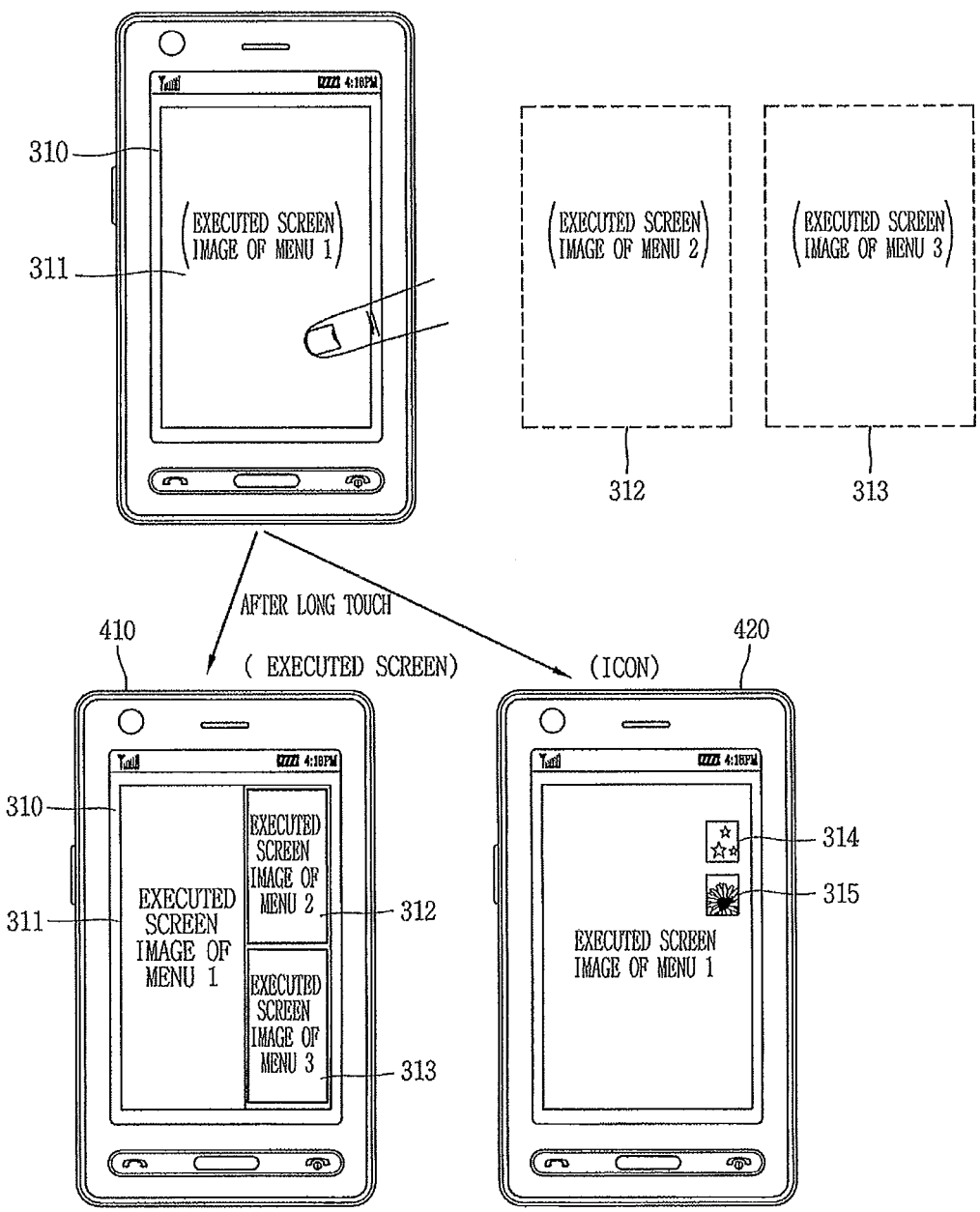

With reference to FIG. 7c, it is assumed that the executed screen image 311 of the particular menu (e.g., menu 1) among the multitasked menus is displayed on the entire screen 310 and the user performs long-touch on a certain point of the executed screen image 311 by longer than a pre-set particular time. When the user performs long-touch on the certain point of the screen image, the controller 180 may divided the display region into two or more regions.

The number, size, position of the divided regions and information outputted to each divided region may be set as a default. Of course, the information set as default may be changed by the user. For example, if it is assumed that the menu is displayed as a Web page executed screen image, when the user performs long-touch on a certain point of the Web page, the controller 180 divides the Web page executed screen image into a pre-set number of regions, and may display pre-set information (e.g., Web page, screen images of already executed menus, detailed information of particular information selected from divided screen images, an empty screen image without information, etc.) on the divided screen images. Namely, the executed screen images of the already multitasked menus may be displayed on the divided regions. Here, if the size of the divided region is small, information displayed on the region may be scaled down or only a portion of the information may be displayed.

The menus may be displayed in the form of executed screen images 311, 312, and 313 (410). Or, the menus may be displayed in the form of icons 314 and 315 (420). Accordingly, as the number of menu execution screen images displayed on the screen increases, the size of the executed screen images of the menus may be reduced.

The size of the executed screen images of the menus and display positions of the executed screen images (or icons) of the menus may be set differently. For example, an executed screen image of a currently displayed menu may be displayed at the central portion of the display region. In addition, the executed screen image of the currently displayed menu may be displayed to be relatively larger than the executed screen images of other menus.

Or, the executed screen image (or icons) of the multitasked menus may be displayed in an overlaid manner at one portion of the screen while maintaining the size of the executed screen image of the currently displayed menu. In this case, the executed screen image of the currently displayed menu may be seen by adjusting the transparency of the executed screen image (or icon).

Figure 7D:
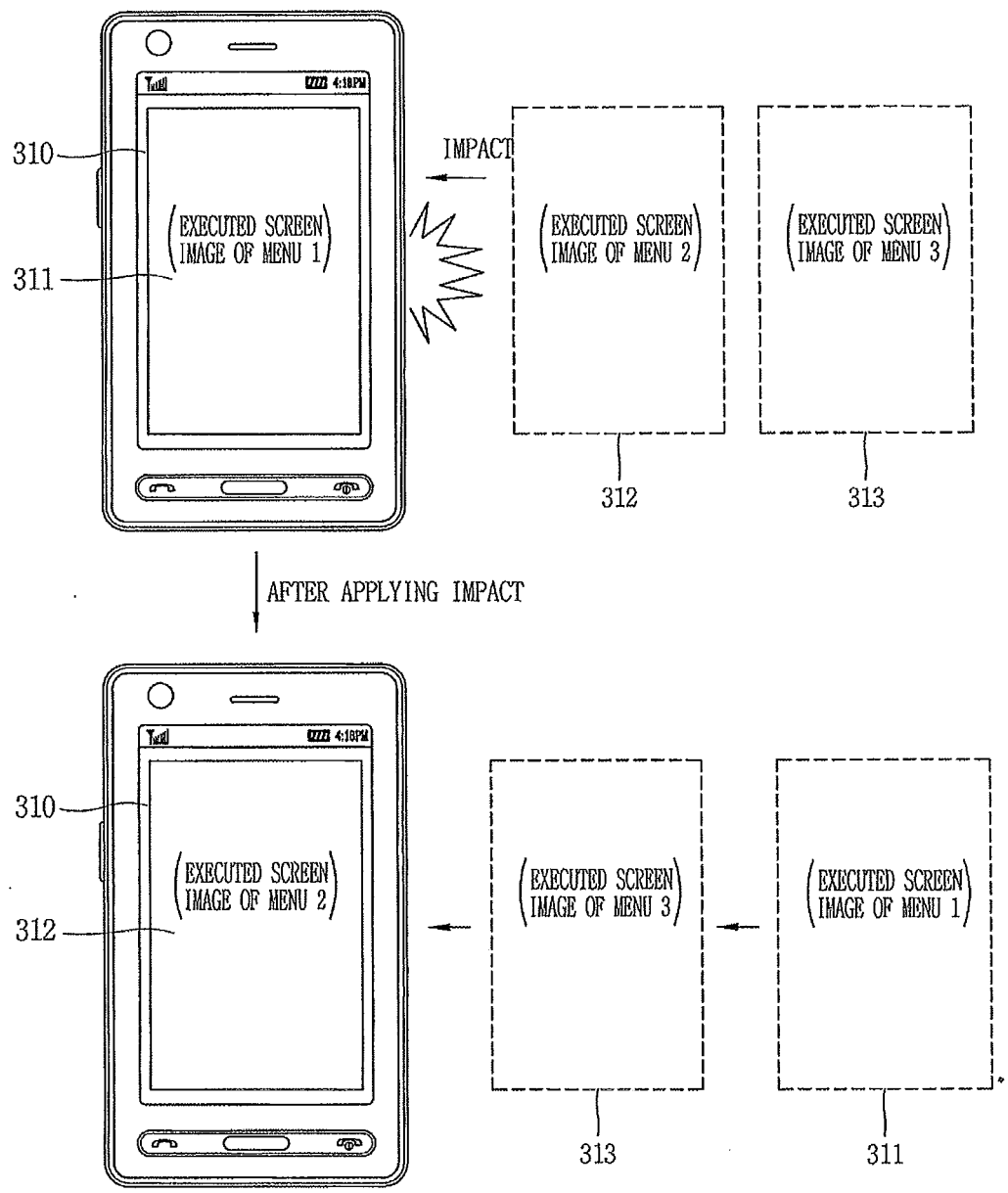

With reference to FIG. 7d, the user may apply an impact stronger than a certain degree of strength to one side of the terminal.

When such impact stronger than the particular degree of strength is instantly applied to one side of the terminal, the controller 180 may slid the executed screen images of the multitasked menus in a particular direction (e.g., the opposite direction of the direction in which the impact has been applied). The instant impact may be applied temporally short and strongly and discriminated from general wobbling. For example, when an impact is applied at the right side of the terminal, the menus may be slid in the left direction. Or, when an impact is applied at the upper side of the terminal, the menus may be slid in a downward direction.

The menus may be set to be slid as default one by one each time an impact is applied. Or, the menus may be changed to be successively slid at certain time intervals set as default. In this case, the menus may be slid in the form of the executed screen images as described above.

The menu executed screen image is changed one by one according to an inputted impact, and if no more impact is inputted, the changed menu is maintained as it is. Namely, the operation of outputting the menu list and the operation of selecting one menu from the list and changing it do not need to be separately performed. If icons of the respective menus are displayed, the icons may be slid in a particular direction.

Or, as shown in FIG. 7e, the user may incline the terminal in one direction.

When the terminal is inclined in one direction, the controller 180 may slid the executed screen images of the multitasked menus in a particular direction (e.g., the inclined downward direction). For example, when the left side is inclined in the downward direction, the menus may be slid from the right to the left. Or, when the right side is inclined in the downward direction, the menus may be slid from the left to the right. Such inclining of the terminal frequency occurs although not intended while the user uses the terminal, so in order to discriminate whether or not it is a user intentional inclining, it may be set such that when inclining is detected in a state that a particular point of the screen image is continuously long-touched, the menus are slid.

FIGS. 7a to 7e illustrate the method of sliding the executed screen images of the multitasked menus in one of the particular directions (e.g., up/down/left/right). In the following embodiment, a method of sliding from a lower layer to an upper layer will now be described. In this embodiment, it is assumed that executed screen images of the multitasked menus are layered as upper/lower layers.

As shown in FIG. 7f, when the user performs a long-touch on a particular point of the screen, executed screen images of menus of another layer may be displayed at a certain time interval. Namely, while the particular point of the screen is long-touched, the controller 180 may sequentially change the executed screen images of the currently multitasked menus to display them as entire screen images.

For example, it may be assumed that an executed screen image of a currently display menu is displayed at the uppermost layer (e.g., Layer 1). Thus, when the user performs a long-touch on the particular point of the currently executed screen image, the controller 180 shifts the currently executed screen image to the lowermost layer (e.g., Layer N) after a particular time, and shifts an executed screen image a menu of the second uppermost layer (e.g., Layer 2) to the uppermost layer.

In this case, the controller 180 may apply a special effect to indicate changing of the executed screen images of the menus. For example, the special effect may include a fade-in/out effect. Namely, the executed screen image of the currently displayed menu fades out after being maintained for a particular time period, and then, the executed screen image of the menu to be displayed next fades in so as to be displayed.

Figure 8A:
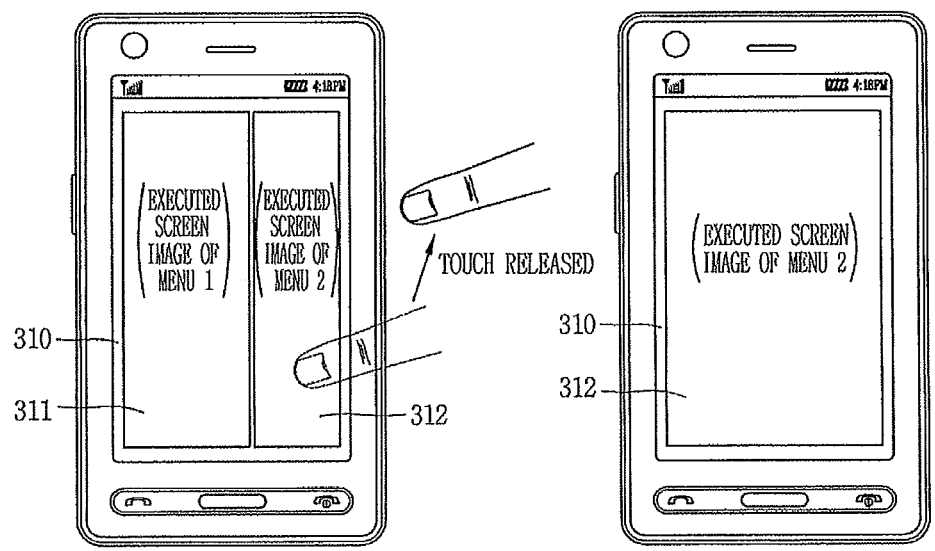
FIGS. 8a and 8b are overviews of display screens illustrating a method for selecting one of slid menus.
Figure 8B:
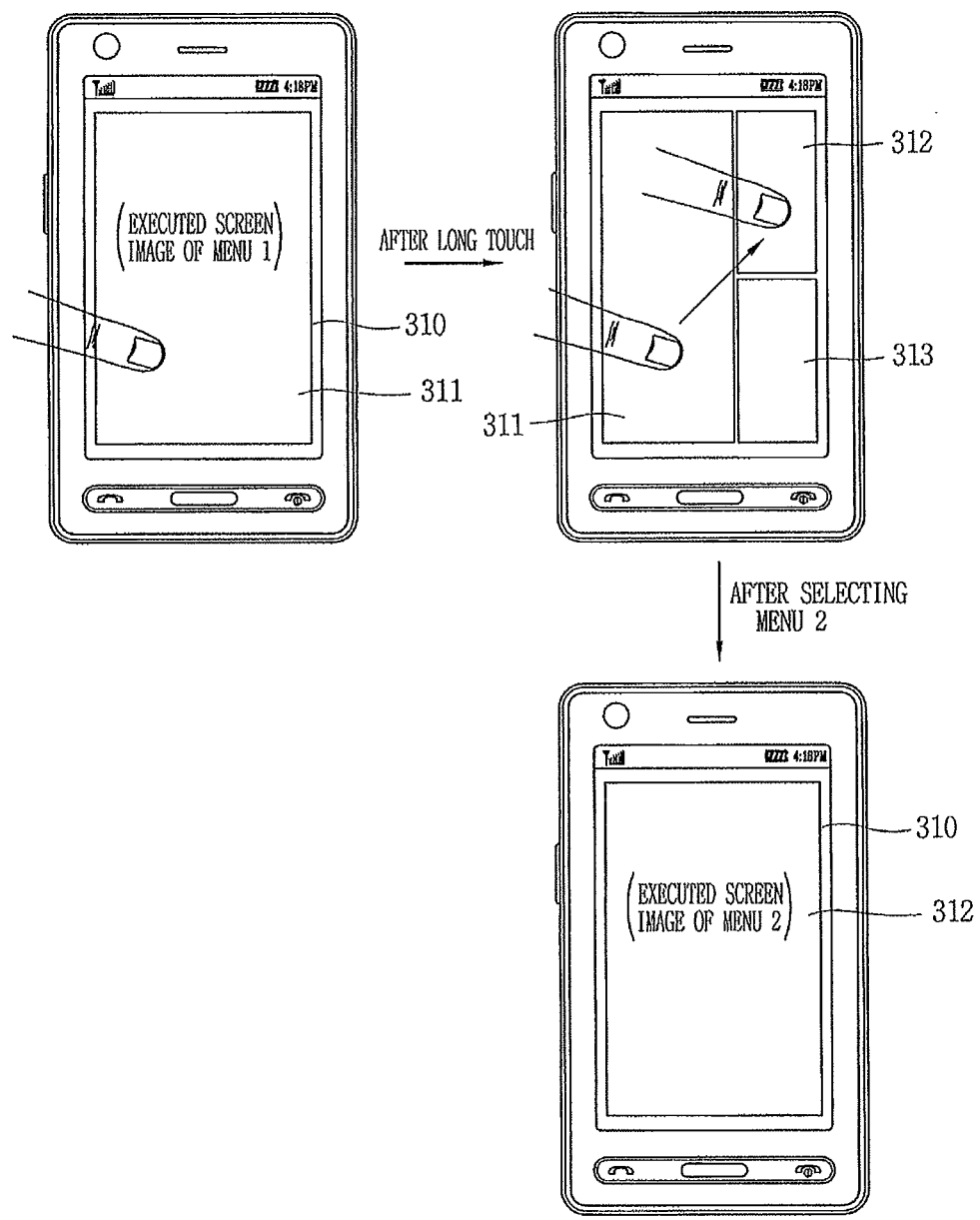

FIGS. 8a and 8b are overview of display screens illustrating a method for selecting one of slid menus.

As shown in FIG. 8a, it is assumed that as the user performs a long-touch on a particular point of the screen, executed screen images of the multitasked menus are continuously slid in a particular direction. When an executed screen image of a particular menu (e.g., menu 2) desired by the user among the executed screen images of the sliding menus passes under the touched point, if the user releases the touch, the controller 180 may display the executed screen image of the menu (e.g., menu 2) passing under the touched point as an entire screen image 310.

Or, although the particular menu does not pass the touched point, if the touch is released in a state that the particular menu is displayed at more than a particular rate (e.g., 50%), the controller 180 may display the executed screen image of the menu as an entire screen image. Namely, a menu desired by the user can be selected from the currently multitasked menus through one-time touch input, and the executed screen image of the menu can be immediately displayed as the entire screen image.

As shown in FIG. 8b, it is assumed that, as the user performs the long-touch on the particular point of the screen, the display region is divided into at least two or more regions and executed screen images of multitasked menus are displayed on the divided sections of the screen.

When the user moves to another section (312) of the screen in a state of touching one section (311 of screen and then release the touch, information which have been displayed on the divided regions (sections) may be interchanged to be displayed. Namely, the information which has been displayed on the section (311) may be displayed on another section (312), and the information which has been displayed on the section (312) may be displayed on the section (311).

When the user selects arbitrary information displayed on the 311 and drags to another section (312), detailed information of the selected information may be displayed on the dragged section (312). For example, in a state that a Web page is displayed on the section 311, if the user selects arbitrary information (e.g., weather item) from the Web page and drags it to the section (312), detailed information about weather may be displayed on the section (312).

Or, when the user performs long-touch on one of the divided regions, the touched section may be magnified to the entire screen.

The method of dividing an executed screen image of one of multitasked menus (e.g., call-related menu, a message-related menu, an Internet-related menu, a video-related menu, music-related menu, and a TV-related menu) is divided, displaying detailed information of particular information on the divided region of the screen or interchanging and displaying information displayed on the divided regions, or selectively displaying one section as an entire screen image has been described.

In this case, when two or more of the same menus are executed, one of them can be selected to be changed to an entire screen image. For example, when two or more Web pages are accessed through a Web browser, when the user performs long-touch on a particular point of the screen in the manner as described above, the controller 180 slides the currently accessed Web pages. Or, in a state that the Web browser is executed, the screen image of the Web browser may be divided to access a different Web page. And, detailed information may be outputted to the divided regions of the screen, or information displayed on the divided regions of the screen may be interchanged to be displayed. And, in order to select one of the divided screen images, listing may be performed in a sliding manner or the selected screen image may be changed to an entire screen image. In this case, the methods as described above with reference to FIGS. 7a to 7f can be all applied.

Further, the present invention can be applicable to a case where the user performs multi-communication (or multi-video call communication) with two or more counterparts.

For example, the present invention can be applicable to a case where the user changes a counterpart with which the user is to perform communication and a counterpart which waits to be connected for call communication. Namely, it is assumed that the user is communicating with one of a plurality of counterparts during call communication, the other counterparts wait to be connected for call communication, and an image of the counterpart of the current call is displayed as an entire screen image (or relatively large image).

In this case, the user may slide the images of the counterparts waiting for call connection, select one of the sliding images of the counterparts, and display the selected counterpart as the entire screen image (or the relatively large screen image). Namely, the user can easily change the counterpart of the current call and the counterparts waiting for call connection.

In addition, in the present invention, the screen image can be divided and a counterpart desired to be newly participated in the call communication may be displayed on the divided regions of the screen. The counterpart displayed on one divided region of the screen may be dragged to another divided region of the screen to interchange the counterpart of the current call and the counterpart waiting for call connection. Detailed information of the counterpart of the current call may be displayed on the divided region of the screen. In this case, the methods as described above with reference to FIGS. 7a to 7f can be all applied.

As so far described, in the present invention, through one-time touch input, the currently multitasked menus can be listed to allow the user to easily select one of them. When the user can select a desired one of the menus, an executed screen image of the selected menu can be immediately displayed as an entire screen image.

In addition, the terminal can display one of the multiple screen images in a sliding manner according to a touch input method, the user can simply select one of the screen images.

Moreover, the screen images of the multitasked menus are slid and the user can simply select one of the screen images in a touch input manner, the user convenience can be improved.

As the exemplary embodiments may be implemented in several forms without departing from the characteristics thereof, it should also be understood that the above-described embodiments are not limited by any of the details of the foregoing description, unless otherwise specified, but rather should be construed broadly within its scope as defined in the appended claims. Therefore, various changes and modifications that fall within the scope of the claims, or equivalents of such scope are therefore intended to be embraced by the appended claims.

What is claimed is:

1. A mobile terminal, comprising:
    a display unit configured to display a screen of a first application being executed;
    a user input unit configured to receive an input, wherein the user input unit comprises at least one of a mechanical key, a dome switch or a touch pad; and
    a controller configured to:
        display, on the display unit, an image corresponding to an executed screen of a second application in response to the input received via the user input unit, wherein the image corresponding to the executed screen of the second application is overlapped with the screen of the first application on the display unit,
        adjust a transparency of the image corresponding to the executed screen of the second application, wherein at least a portion of the screen of the first application is seen when the transparency of the image corresponding to the executed screen of the second application is adjusted,
        display, on the display unit, a screen of the second application being executed in a full screen mode when the image corresponding to the executed screen of the second application is selected, and
        display, on the display unit, an image corresponding to an executed screen of a third application with the image corresponding to the executed screen of the second application,
    wherein the touch pad is disposed on the display unit, and
    wherein the images corresponding to the executed screens of the second application and the third application are moved in a direction in response to a specific touch input applied on the display unit.

2. The mobile terminal of 1, wherein the first application and the second application are executing in a multi-tasking manner on the mobile terminal.

3. The mobile terminal of claim 1, wherein a size of the screen of the first application is maintained constantly although the image corresponding to the executed screen of the second application is overlapped with the screen of the first application based on the input received via the user input unit, and
    wherein the image corresponding to the executed screen of the second application is a reduced image of the executed screen of the second application.

4. The mobile terminal of claim 1, wherein the screen of the first application is presented as a full screen,
    wherein the screen of the first application disappears when the image corresponding to the executed screen of the second application overlapped with the screen of the first application is selected, and
    wherein the screen of the second application is displayed as a full screen after the screen of the first application disappears.

5. The mobile terminal of claim 1, wherein a size of the screen of the first application is larger than the image corresponding to the executed screen of the second application.

6. The mobile terminal of claim 1, wherein the image corresponding to the executed screen of the third application is displayed by sliding the image corresponding to the executed screen of the second application.

7. The mobile terminal of claim 1,
    wherein the image corresponding to the executed screen of the second application is displayed when a touch input for displaying an application list of one or more applications which are executed in a multi-tasking manner is received at the touch pad.

8. A control method of a mobile terminal, the method comprising:
    displaying, on a display unit, a screen of a first application being executed;
    receiving an input via a user input unit, wherein the user input unit comprises at least one of a mechanical key, a dome switch or a touch pad;

displaying, on the display unit, an image corresponding to an executed screen of a second application in response to the input received via the user input unit, wherein the image corresponding to the executed screen of the second application is overlapped with the screen of the first application being executed;

adjusting a transparency of the image corresponding to the executed screen of the second application, wherein at least a portion of the screen of the first application is seen when the transparency of the image corresponding to the executed screen of the second application is adjusted;

displaying, on the display unit, a screen of the second application in a full screen mode when the image corresponding to the executed screen of the second application is selected; and displaying, on the display unit, an image corresponding to an executed screen of a third application with the image corresponding to the executed screen of the second application, wherein the touch pad is disposed on the display unit, and wherein the images corresponding to the executed screens of the second application and the third application are moved in a direction in response to a specific touch input applied on the display unit.

9. The method of claim 8, wherein an empty space is positioned between the images corresponding to the executed screens of the second application and the third application.

10. The method of claim 8, wherein the images corresponding to the executed screens of the second application and the third application are positioned vertically.

11. A mobile terminal, comprising:
a display unit;
a user input unit configured to receive an input, wherein the user input unit comprises at least one of a mechanical key, a dome switch or a touch pad; and
a controller configured to:
display, on the display unit, one or more images corresponding to an executed screen of one or more applications in response to the input, wherein the one or more images are one or more reduced images corresponding to each executed screen of the one or more applications, and wherein each of the one or more applications is executed in a multi-tasking manner on the mobile terminal,
adjust a transparency of one of the one or more images corresponding to the each executed screen of the one or more applications,
display, on the display unit, a screen of one application of the one or more applications in a full screen mode when a reduced image corresponding to the one application is selected, and
display, on the display unit, an image corresponding to an executed screen of another application of the one or more applications by sliding the one or more images corresponding to the each executed screen of the one or more applications in response to a touch input applied on the display unit, wherein the touch pad is disposed on the display unit.

12. The mobile terminal of claim 11, wherein the one or more images are overlapped with a screen of a first application being executed on the display unit.

13. The mobile terminal of 12, wherein a size of the screen of the first application is maintained constantly although the one or more images are overlapped with the screen of the first application based on the input received via the user input unit.

14. The mobile terminal of claim 12, wherein screen information related to the one or more images are displayed transparently so the screen of the first application can be seen.

15. The mobile terminal of claim 12, wherein an image corresponding to an executed screen of a second application is displayed based on sliding the one or more images.

16. A control method of a mobile terminal, the method comprising:
receiving an input via a user input unit, wherein the user input unit comprises at least one of a mechanical key, a dome switch or a touch pad;
displaying, on a display unit one or more images corresponding to an executed screen of one or more applications in response to the input, wherein each of the one or more applications is executed in a multi-tasking manner on the mobile terminal, and wherein the one or more images are one or more reduced images corresponding to the each executed screen of the one or more applications;
adjusting a transparency of one of the one or more images corresponding to the each executed screen of the; and
displaying, on the display unit, one application of the one or more applications in a full screen mode when a reduced image corresponding to the one application is selected; and
displaying, on the display unit, an image corresponding to an executed screen of another application of the one or more applications by sliding the one or more images corresponding to the each executed screen of the one or more applications in response to a touch input applied on the display unit, wherein the touch pad is disposed on the display unit.

17. The method of claim 8, wherein the image corresponding to the executed screen of the third application is displayed by sliding the image corresponding to the executed screen of the second application.

* * * * *